United States Patent [19]
Haibach et al.

[11] Patent Number: 5,206,070
[45] Date of Patent: Apr. 27, 1993

[54] ZONE COATED ADHESIVE MATERIAL FOR PROTECTING AND SECURING ELECTRONIC/ELECTRICAL CABLES

[75] Inventors: John W. Haibach, Kenosha, Wis.; John F. Starkey, Hoffman Estates, Ill.

[73] Assignee: Specialty Tapes Division of RSW Inc., Racine, Wis.

[21] Appl. No.: 675,249

[22] Filed: Mar. 25, 1991

[51] Int. Cl.[5] .......................... B32B 1/04; B32B 3/06; B32B 7/14

[52] U.S. Cl. ................... 428/194; 428/190; 428/247; 428/354

[58] Field of Search ............... 428/194, 247, 190, 192, 428/352, 354

[56] References Cited

U.S. PATENT DOCUMENTS

| | | | |
|---|---|---|---|
| 732,889 | 7/1903 | Paver | 229/93 |
| 1,726,744 | 9/1929 | Krug | 428/196 |
| 1,923,513 | 8/1933 | Steinert | 602/77 |
| 2,311,573 | 2/1943 | Shoan | 428/247 X |
| 2,349,709 | 5/1944 | Evans | 428/196 |
| 2,387,593 | 10/1945 | Lesser | 428/190 |
| 2,510,120 | 6/1950 | Leander | 428/191 |
| 2,705,209 | 3/1955 | Rowe | 428/194 X |
| 2,854,352 | 9/1958 | Gronemeyer | 428/193 |
| 3,125,460 | 3/1964 | Rose | 428/194 |
| 3,540,975 | 11/1970 | Wright et al. | 428/194 |
| 3,567,566 | 3/1971 | Bandel et al. | 428/247 X |
| 4,087,577 | 5/1978 | Hendrickson | 428/247 X |
| 4,427,726 | 1/1984 | Wolfrum | 428/194 X |
| 4,503,114 | 3/1985 | Cohen | 428/247 |
| 4,533,578 | 8/1985 | Boyd et al. | 428/194 X |

*Primary Examiner*—George F. Lesmes
*Assistant Examiner*—D. R. Zirker

[57] ABSTRACT

A zone adhering adhesive tape material for releasably retaining one or more electric or electronic conduit members of interest or the like in position with respect to an adjacent surface is disclosed which includes a continuous, flexible web of backing material in strip form and a pair of spaced parallel zones of adhesive material applied along both edges of one side of the backing material defining a relatively wide non-adhesive zone therebetween. The material attaches the conduit members releasably under the non-adhesive zone.

6 Claims, 1 Drawing Sheet

ZONE COATED ADHESIVE MATERIAL FOR PROTECTING AND SECURING ELECTRONIC/ELECTRICAL CABLES

BACKGROUND OF THE INVENTION

1. Field of the Invention

The present invention is directed generally to a zone coated adhesive strip material for removably securing connecting conductor devices such as electrical or electronic cables in place, particularly for use during temporary or short-term hookups. This includes securing bunches of parallel conductor cables such as are commonly used in temporarily set up exhibits in convention centers, entertainment hookups, in auditoriums, night clubs, stadiums, or the like. In particular, the invention is directed to a novel strip material having spaced parallel adhesive bands along both edges of one side thereof for temporarily securing a cable or cables in place on a surface without adhering to the cables themselves.

2. Description of the Related Art

Everyone is familiar with the great proliferation of electrical and electronic devices for use in all types of environments in both permanent and temporary hookups. These include networking systems for a plurality of personal computers, the familiar many-cabled mazes for complex audio systems transported in for rock concerts, or the like, and those for sound stages or any one of a multitude of other similar applications. One thing all these installations or hookups have in common is the need for running anywhere from one up to a very large number of cables between various components of the system. Because of the wide variance in environments which these set ups must necessarily encounter, the associated wires and cables must pass over a great variety of surface materials. Simply stringing the cables between the various devices will provide the required electronic connections; however, it also presents an immense safety hazard and is, in most cases, prohibited. These cables are quite often underfoot where people have to walk, and those traversing the vicinity may trip over them and be injured and/or accidentally unhook one or more connections.

Such installations normally require that the cables be grouped together as much as possible and covered by some type of protective retaining material where it is at all likely that someone might encounter loose cables and trip over them during the term the set up is in place. Traditionally, in fact, for over four decades, the main material utilized to cover and/or secure cables in such installations is the familiar woven backed adhesive material generally referred to as "duct tape". This material got its name, of course, from its long-term use in covering the joints between sections of sheet metal duct work associated with forced air heating, ventilating and air conditioning installations. Because the material is easy to use, sticks to a variety of surfaces and is readily available, it has long been used for installations associated with the entertainment/communications and information dissemination hookups of the class described. In fact, within the motion picture industry, there are certain workers who are responsible for installing and arranging the lighting on motion picture sets known as gaffers. These gaffers have used a material which is a slight modification of traditional duct tape so long that it has come to be known over the years as "gaffer's tape".

While the duct tape or gaffer's tape successfully covers and retains the cables of interest and has provided a reasonably acceptable installation method, it suffers from certain important drawbacks. One side of the tape is completely covered with a rather strong adhesive such that adhesive material attaches and adheres to the surfaces of cables being retained under the tape. When the tape is removed, adhesive material often sticks to and remains on the cables, making them more difficult to handle for removal, storage and reinstallation elsewhere. In fact, over a period of time, this material builds up and must, at great difficulty and cost, be periodically removed as by solvent cleaning which is destructive to the cable material. In addition, the adhesive material associated with duct or gaffer tape, when allowed to remain in place over a period of time, becomes increasingly difficult to remove from many surfaces such as carpeting, wooden floors and painted surfaces. Removal thereafter may cause damage in terms of retained residue or actual damage to the surface itself in removing material such as paint or carpet fibers from the surface to which the tape is caused to adhere.

Other prior tapes exist which include types of tapes in which the adhesive material is not continuous throughout at least one surface of the tape. These include a tape material illustrated and described in U.S. Pat. No. 1,726,744, in the form of a paper or cloth tape having an adhesive on one edge of each of the opposing sides for use in masking for painting automobile bodies, or other such surfaces. Patents to Steinert (U.S. Pat. No. 1,923,513), Evans (U.S. Pat. No. 2,349,709), and Lesser (U.S. Pat. No. 2,387,593) disclose tape materials having intermittently spaced stripes containing adhesive material. Other tapes include tapes of woven fiberglass and other materials. There remains a need, however, for a readily installable, readily removable tape which has sufficient strength to retain cables of the class described in place during the use of an entertainment installation, or the like, but which is flexible and can be readily removed when desired and readhered and which, at the same time, does not adhere to the cables or wires itself or damage adjacent surfaces.

SUMMARY OF THE INVENTION

In accordance with the present invention, there is provided a novel adhesive strip material which can be used to fasten one or more parallel cables, wires, or the like, in place to a wide variety of surfaces in a manner which retains the wires or cables in place without the adhesive material contacting the wires or cables and in a manner which allows them to be readily removed, or even additional wires or cables added under the adhesive strip material, after initial installation, the adhesive material being thereafter replaced. The adhesive strip material of the present invention contemplates a special tape material having longitudinal spaced parallel adhesive strips separated by an uncoated center section containing no adhesive material. The adhesive material itself is one which readily and removably attaches to most surfaces with sufficient force to retain the cables or wires in place, as needed, but in a manner which allows easy removal and readherence without doing any damage to the adjacent surface to which it is attached. The adhesive free central section or zone of the strip material is designed to fit over the wires or cables of interest, forming, in effect, a tunnel, retaining them in place based on the adhesion of the pair of spaced, parallel outer adhesive strips to the adjacent surface.

The tape of the invention can be fabricated from any material having the requisite properties, including types of woven fabric such as cloth or fiberglass, or fabricated from any known polymer material or laminated material which impart the desired strength and flexibility characteristics together with the chemical compatibility required for any particular adhesive application. Of course, the adhesive material must be one that is chemically compatible with the material of the backing or fabric of the strip or tape. It must also be one which has the requisite adhesive properties with surfaces encountered, providing sufficient adhesion to accomplish the desired fixing of the cables in place combined with the ability to be removed readily without leaving adhesive material on the surface or otherwise damaging the surface as by removing paint, wood or carpet fibers.

While many types of materials are contemplated or would be compatible with the requirements of the tape of the invention, it is preferably made of materials which are inexpensive and easy to process so that the tape is competitive in price with traditional alternatives. The preferred embodiment is in the form of a laminated construction which includes a central layer of woven fabric scrim, which may be cloth or fiberglass or other such material, sandwiched between layers of high and low density polyethylene. This combination provides the desired flexibility and strength, together with lightness and ease of handling. The material may be readily separated or torn into lengths by hand. One side of the composite or laminated structure is provided with a pair of spaced parallel strips of adhesive material extending to the edges thereof. The preferred adhesive material is an acrylic, rubber-based, or synthetic rubber, e.g., silicone-based removable adhesive, such as a crosslinked silicone, which readily adheres to a great variety of surfaces, is easily removed and may be readhered, if necessary.

The adhesive may be spaced intermittently and the material may be of any desired width or thickness. The material may be perforated or partially perforated. The material may be conveniently fabricated in roll form, strips or patches. In addition, the material or material surface may be colored or color coded in any manner desired.

BRIEF DESCRIPTION OF THE DRAWINGS

In the drawings, wherein like numerals are utilized to designate like parts throughout the several views.

DETAILED DESCRIPTION

Figure 1:
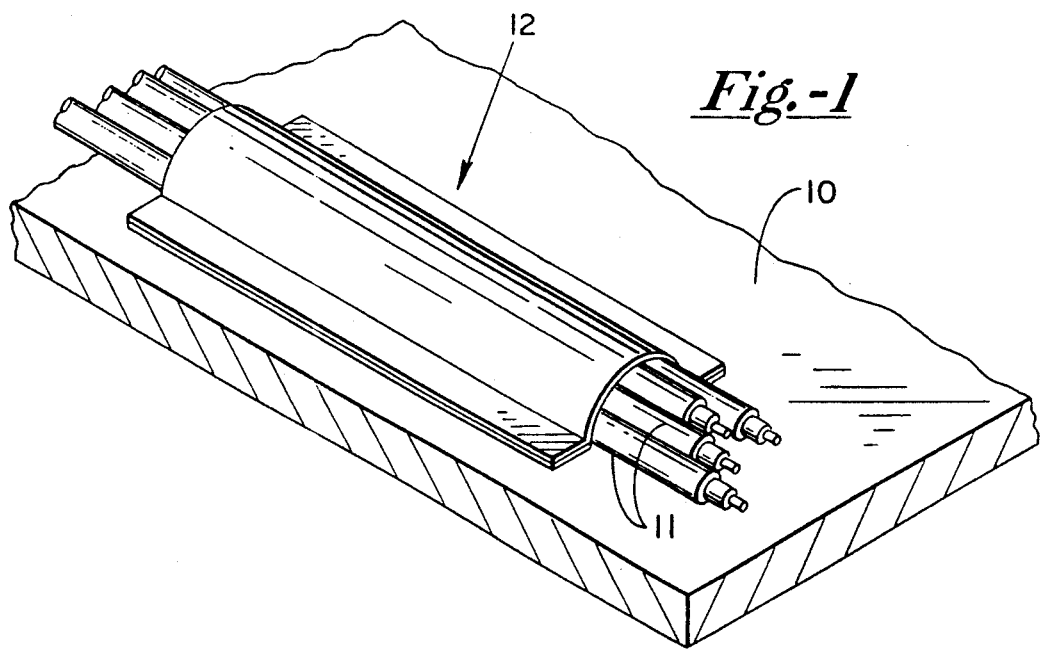
FIG. 1 is a fragmentary perspective view showing a plurality of insulated electrical conductors secured to a surface as a bundle by a section of the tape material of the invention.
Figure 2:
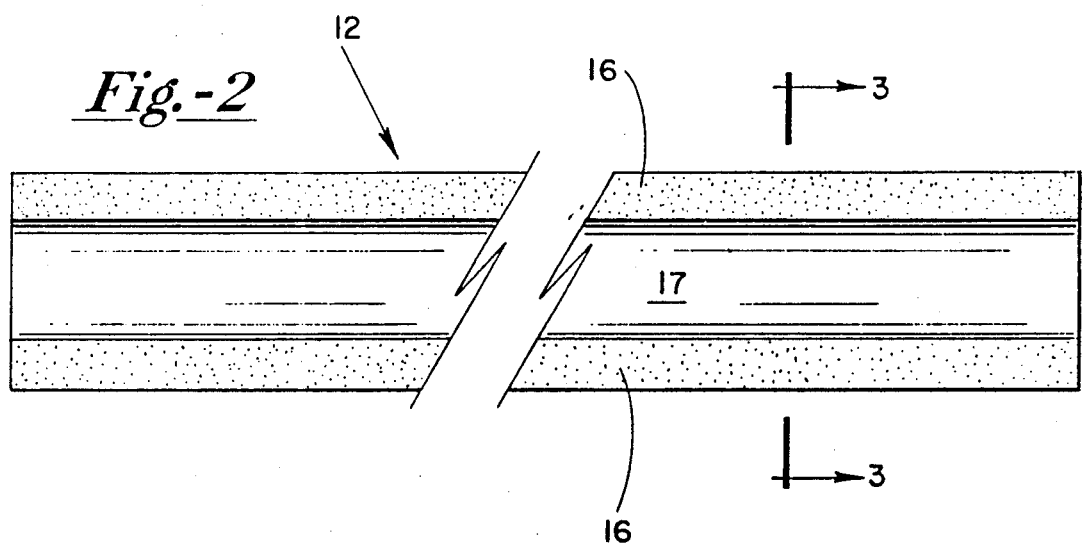
FIG. 2 is a broken plan view of the tape material of FIG. 1.

Whereas the material of the invention is capable of taking on any one of a number of contemplated forms, those illustrated by the accompanying drawings will be described as a representative embodiment of the invention. FIG. 1 depicts a fragmentary perspective view which includes a representative surface 10, which may be a wood floor, wall, molding or any other conceivable type of surface over which cables of the class described might be strung to make connections of a temporary installation. The figure illustrates a plurality of parallel insulated conductors 11 gathered in a bundle and held together and to the surface 10 by a section of the tape of the invention 12.

Figure 3:
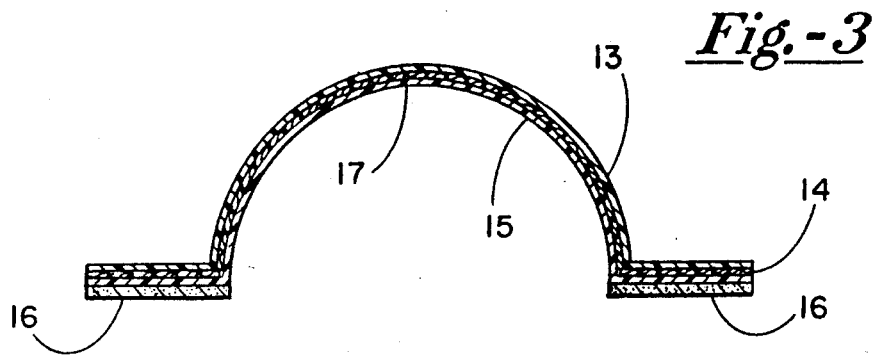
FIG. 3 is a sectional view taken along lines 3—3 of FIG. 2.

As better seen in the cross-sectional view of FIG. 3, the adhesive tape material of the invention comprises a laminated construction, including a central scrim or such as woven cloth or a gauze layer 13, surrounded by high and low density polyethylene layers 14 and 15. The adhesive material is adhered to either the low density or the high density polyethylene layer in spaced parallel outer strips 16 separated by a relatively wide central section having no adhesive at 17.

The novel tape of the invention can be applied and removed easily and conveniently in many applications requiring the stringing of cables. Special emphasis is placed on entertainment and communications installations because these are the most common. The cables are retained under the "tunnel" formed when the tape is applied and, therefore, only the bare central section comes in direct contact with the cables. Thus, no adhesive can stick to the cables. The adhesive used is one that will do no harm to most conventional surfaces and which can be removed readily and re-adhered if desired.

As previously stated, the material of the tape may be a laminate; it may be a cloth or plastic or any other material which would meet the requirements of a particular installation or class of installations. For example, certain types of cables transmitting radio frequency or other special signals may require specific types of isolation from other cables, and this can be provided utilizing the necessary materials for the tape itself. In addition, the adhesive material may be any adhesive material chemically and physically compatible with the material of the tape and which has the desired adhesive properties with respect to the surface to which it is to adhere and which, at the same time, allows release from that surface without damage.

The illustrations, of course, show but one of myriads of applications for which the tape of the invention may be utilized. The tape can be used to secure a single cable, multiple cables, a single wire or multiple wires, or other types of specialty conduits of information or electrical signals which would require tape of the class described. The tape can be made with any desired width and with any desired width of adhesive strips so long a the central segment of the tape is sufficient to encompass the cable or cables of interest. It is further contemplated that the material of the outer layer of the tape of the invention may be color-coded in any fashion desired to identify particular cables attached or to otherwise warn passersby of the presence of the strung cables, especially in high traffic areas.

In use, the tape is simply laid down over the cable or cables of interest and pressed into place to assure adherence to the adjacent surface and can be used throughout the length of the cable or as intermittent retaining strips. The central section of the tape retains the cable or cables in place effectively without requiring the cable or cables to contact the adhesive material. As suggested above, one major advantage lies in the fact that, should adjustments to the position of the cable or cables, or the addition or deletion of cables from a bundle be required, or should cabling be misaligned, the invention allows the user to easily lift one side of the tape from the surface of interest and insert or remove cables and replace the raised portion of tape without loss of adhesive properties. It can readily be seen that the tape of the invention allows the user to protect any cable or cables in a manner more efficient than that available with prior products. In addition, valuable property including, but not limited to, cables and carpeting are spared from the accumulated adhesive damage.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different means, and that various modifications, both as to the details and operating procedures, can be accomplished without departing from the scope of the invention itself.

What is claimed is:

1. A zone adhering composite retaining article in generally strip form for releasably adhesively retaining one or more elongated flexible members, such as electrical cables, positioned with respect to an adjacent surface comprising:

a continuous, hand tearable, flexible laminated web backing consisting essentially of a fabric scrim layer sandwiched between first and second polymer layers in strip form, the laminate further having first and second outer surfaces;

an amount of adhesive applied along both edges of the first outer surface of the backing thereby forming a pair of spaced parallel adhesive zones defining an adhesive-free zone therebetween, wherein the adhesive-free zone is of greater width than the adhesive zones;

wherein the adhesive is a re-adhering synthetic pressure sensitive composition which is retained on the backing but adheres repeatedly to and readily releases from adjacent surfaces; and wherein the first and second polymer layers are high and low density polyethylene, respectively.

2. The zone adhering composite retaining article of claim 1 wherein the second outer surface of the backing is provided with one or more colors.

3. The zone adhering composite retaining article of claim 1 wherein the backing material contains perforations.

4. The zone adhering composite retaining article of claim 1 wherein the material is in roll form.

5. The zone adhering composite retaining article of claim 4 wherein the roll of material is in the form of a plurality of serially connected segments readily separable by hand tearing.

6. A zone adhering composite retaining article in generally strip form for releasably adhesively retaining one or more elongated flexible members, such as electrical cables, positioned with respect to an adjacent surface comprising:

a continuous, hand tearable, flexible laminated web backing consisting essentially of a fabric scrim layer sandwiched between first and second polymer layers in strip form, the laminate further having first and second outer surfaces;

an amount of adhesive applied along both edges of the first outer surface of the backing thereby forming a pair of spaced parallel adhesive zones defining an adhesive-free zone therebetween, wherein the adhesive-free zone is of greater width than the adhesive zones;

wherein the adhesive is a re-adhering synthetic pressure sensitive composition which is retained on the backing but adheres repeatedly to and readily releases from adjacent surfaces;

wherein the first and second polymer layers are high and low density polyethylene, respectively; and wherein the first outer surface carrying the adhesive is the outer surface of the second polymer layer.

* * * * *